US012237732B2

(12) United States Patent
Ponzio et al.

(10) Patent No.: US 12,237,732 B2
(45) Date of Patent: Feb. 25, 2025

(54) DEVICE FOR POSITIONING ENDS OF AT LEAST FIRST PAIR OF LEGS OF HAIRPIN CONDUCTORS

(71) Applicant: ATOP S.p.A., Florence (IT)

(72) Inventors: Massimo Ponzio, Siena (IT); Rubino Corbinelli, Siena (IT)

(73) Assignee: ATOP S.p.A., Barberino Tavarnelle (IT)

(*) Notice: Subject to any disclaimer, the term of this patent is extended or adjusted under 35 U.S.C. 154(b) by 826 days.

(21) Appl. No.: 17/298,910

(22) PCT Filed: Dec. 19, 2019

(86) PCT No.: PCT/EP2019/086294
§ 371 (c)(1),
(2) Date: Jun. 1, 2021

(87) PCT Pub. No.: WO2020/127724
PCT Pub. Date: Jun. 25, 2020

(65) Prior Publication Data
US 2022/0069679 A1   Mar. 3, 2022

(30) Foreign Application Priority Data
Dec. 21, 2018  (EP) .................................. 18215155

(51) Int. Cl.
*H02K 15/00*   (2006.01)
*B23K 31/02*   (2006.01)
(Continued)

(52) U.S. Cl.
CPC ......... *H02K 15/0081* (2013.01); *B23K 31/02* (2013.01); *B23K 37/0435* (2013.01);
(Continued)

(58) Field of Classification Search
CPC ........... H02K 15/0081; H02K 15/0421; H02K 15/04; H02K 15/0056; B23K 31/02; B23K 37/0435; B23K 2101/38; Y10T 29/53143
See application file for complete search history.

(56) References Cited

U.S. PATENT DOCUMENTS

| | | | |
|---|---|---|---|
| 9,757,820 B2 * | 9/2017 | De Souza | B23K 37/0435 |
| 2008/0148551 A1 * | 6/2008 | Hara | H02K 15/0081 29/598 |
| 2018/0166796 A1 * | 6/2018 | Yanagisawa | H02K 15/04 |

FOREIGN PATENT DOCUMENTS

| | | | |
|---|---|---|---|
| JP | 2010124542 A | * | 6/2010 |
| JP | 2015-029999 | | 2/2015 |

(Continued)

OTHER PUBLICATIONS

Machine Translation of Japanese Patent Publication, JP 2015-35922, 2024. (Year: 2024).*

(Continued)

*Primary Examiner* — A. Dexter Tugbang
(74) *Attorney, Agent, or Firm* — Haley Guiliano LLP; Jeffrey H. Ingerman

(57) ABSTRACT

A device for positioning the ends of at least first pair of legs of hairpin conductors extending from a stator core with respect to a welder tool includes a first clamping element and a second clamping element that are independently moveable radially. The first clamping element has a first clamping surface and said second clamping element has a second clamping surface, wherein the clamping surfaces radially face each other. The clamping elements form a first radially inner receiving section between the first clamping surface and the second clamping surface, having a first radial width dimensioned to axially receive and clamp a first pair of legs during welding, and a second radially outer receiving sec- (Continued)

Figure 1:
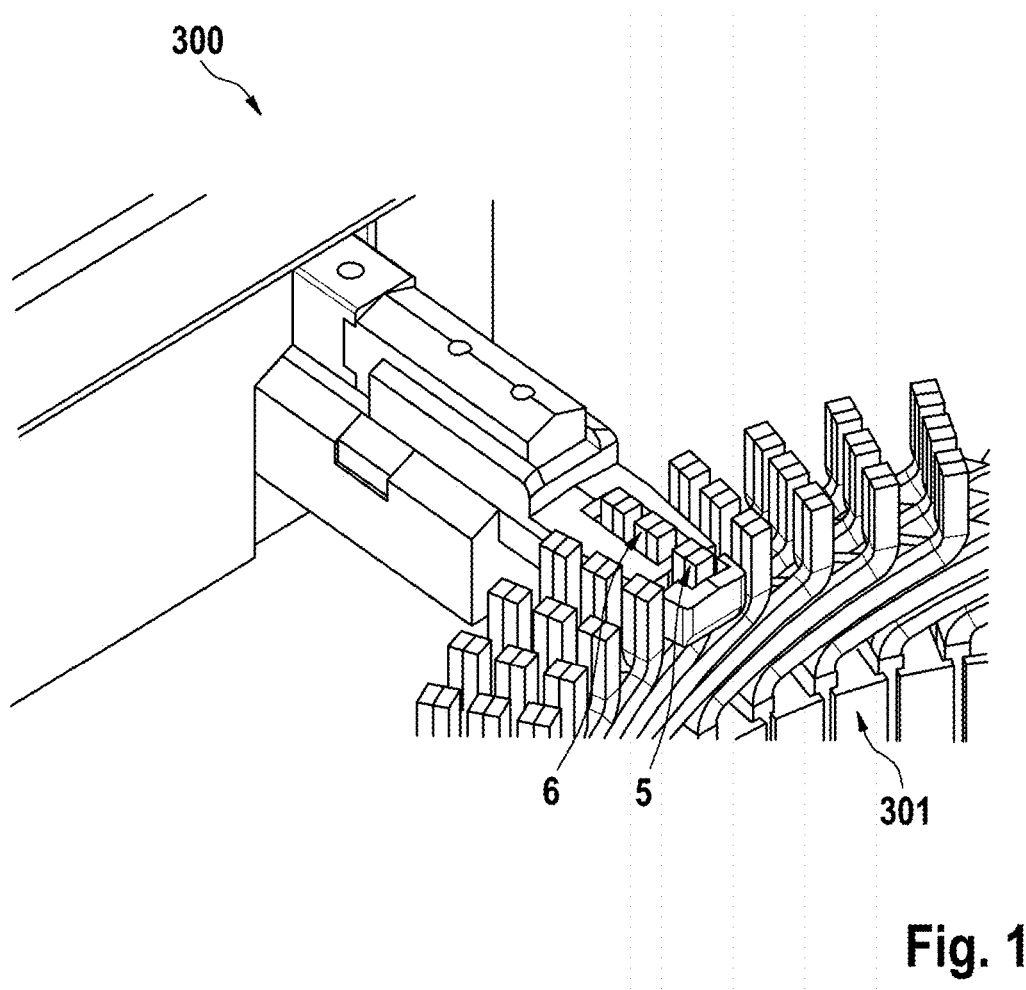

tion inside the first and second clamping elements, having a second radial width dimensioned to receive at least a further pair of legs during welding of the first pair of legs.

19 Claims, 8 Drawing Sheets

(51) Int. Cl.
*B23K 37/04* (2006.01)
*H02K 15/04* (2006.01)
*H02K 15/0421* (2025.01)
*B23K 101/38* (2006.01)

(52) U.S. Cl.
CPC ...... *H02K 15/0421* (2013.01); *B23K 2101/38* (2018.08); *H02K 15/04* (2013.01); *Y10T 29/53143* (2015.01)

(56) References Cited

FOREIGN PATENT DOCUMENTS

| JP | 2015-035922 | 2/2015 |
|----|-------------|--------|
| JP | 2015-171260 | 9/2015 |

OTHER PUBLICATIONS

Glaessel et al, "Challenges in the manufacturing of hairpin windings and application opportunities of infrared lasers for the contacting process," 2017 7th International Electric Drives Production Conference (EDPC), Würzburg, Germany, 2017, pp. 1-7. (Year: 2017).*

* cited by examiner

DEVICE FOR POSITIONING ENDS OF AT LEAST FIRST PAIR OF LEGS OF HAIRPIN CONDUCTORS

CROSS-REFERENCE TO RELATED APPLICATIONS

This application is a national stage application under 35 U.S.C. § 371 of International Application PCT/EP2019/086294, filed Dec. 19, 2019, which claims the benefit of and priority from European Patent Application No. 18215155.5, filed Dec. 21, 2018, the contents of each of which are hereby incorporated by reference herein in their entirety.

The present invention relates to a device, a system and a method for positioning the ends of at least first pair of legs of hairpin conductors extending from a stator core with respect to a welder tool.

Generally the present invention relates to apparatuses and processes for aligning wire conductors members inserted in slots of a core of a dynamo electric machine.

In a typical manufacturing scenario coil members are inserted in slots of a core of an electric dynamo machine. Pairs of wire conductors extending from the coil members are welded together, wherein each conductor belongs to a coil member. Coil members of this type can be those having a fork like shape, normally referred to as "U shaped coil members" or "hairpins" in the art.

Stators wound with hairpin coil members are typically used for electric drives or hybrid drives of automotive vehicles.

The hairpin conductors may be arranged in nests outside the stator core. After insertion of a nest into the core, the ends of the hairpin conductors have to be arranged, such that pairs of ends belonging to conductors to be connected are close to each other.

The welding operation can be carried out by using a laser beam, or by resistance heating, in order to melt and thereby join the pairs of conductors. The resulting connection joint needs to have specific mechanical and electrical characteristics.

A fundamental requirement of the connection operation is the accurate and repeatable positioning of the ends of conductors with respect to each other and to a welder tool, like the laser beam, which needs to be directed on the ends of the pairs of conductors to produce the connection joint of the weld.

WO2018/185620 discloses an apparatus for aligning wire conductors comprising an alignment unit having a plurality of independently moveable members, which maintain the ends of the pairs of conductors in a proper position during and after the alignment step for performing the welding operation. The alignment unit may be set up for different configurations of the stators with different winding and size characteristics of the stator types. For each alignment step a plurality of members movements are necessary.

As the design of recent stators provides only little space between the ends of the pairs of conductors the tools for positioning, holding and welding the ends of the pairs of conductors must occupy little space.

A large straightening force has to be applied to the conductors without damaging the conductors' insulation.

An increased hourly production of these stators requires a reduction in the time available for performing the welding operation. This leaves less time for carrying out the alignment of the ends of the pairs of conductors.

It is an object of the present invention to avoid the drawbacks of the state of the art and in particular to provide devices and methods for quick and precisely arranging ends of hairpin conductors.

According to the present invention, these and other objects are solved with a method and an apparatus according to the independent patent claims.

According to the present invention a device for device for positioning the ends of at least first pair of legs of hairpin conductors extending from a stator core with respect to a welder tool is provided.

Said device preferably comprises a support for holding said stator core.

The stator core may alternatively be supported by an external carrier. The support or the carrier may be configured to hold the stator core in a fixed position or may be configured to rotate the stator core with respect the stator core axis.

The device further comprises a first clamping element and a second clamping element. Said first clamping element and said second clamping element are independently moveable radially relative to each other. Both clamping elements may be moveable. Alternatively, one of the clamping elements may remain stationary, while only the other one is moved.

Said first clamping element has a first clamping surface and said second clamping element has a second clamping surface. The first and the second clamping surface are radially facing each other.

By a relative radial movement of the clamping elements the distance between the clamping surfaces may be changed.

The relative radial movement may be achieved by a linear translation in radial direction. The relative radial movement may also be achieved by a swivelling movement or a rotary movement of at least of one of the first and the second clamping element.

The clamping elements form a first, preferably radially inner, receiving section between the first clamping surface and the second clamping surface. The first receiving section has a first radial width dimensioned to axially receive and clamp a first pair of legs during welding.

The radial extension of a leg of a conductor is typically in a range of 2 mm to 5 mm. The circumferential extension of a leg of a conductor is also typically in a range of 2 mm to 5 mm.

Accordingly, the first receiving section has a maximal radial width in the range of 4.5 mm to 10.5 mm, i.e. with a clearance of 0.25 mm between the sidewalls of the conductors and the walls of the receiving sections.

The clamping elements further form a second, preferably radially outer, receiving section inside the first and second clamping element. The second receiving section has a second radial width dimensioned to receive at least a further pair of legs during welding of the first pair of legs.

Preferably the second receiving section has a radial width in the range of 11 mm to 23 mm.

The clamping elements preferentially are moveable upwards and downwards in an axial (normally vertical) direction, preferably together.

By a, preferably joint, radial and axial movement of the clamping elements the receiving sections may be brought into a radial and axial position for receiving the pairs of legs.

The distance between the clamping surfaces may be changed by a relative radial movement of the clamping elements. The clamping elements may take a first position for receiving a non-welded pair of legs and a second position, in which the pair of legs is pressed together. Preferably during relative movement one of the clamping elements is kept at a fixed position, while the other clamping element is radially moved. Alternatively both clamping elements may perform a relative movement.

By relatively moving the clamping elements a large straightening force may be applied to the legs of the conductors.

During radial movement of at least one of the clamping elements and pressing together a first pair of legs, at least a second pair of legs may be hosted in a second receiving section. In a further step the device may be positioned such that the second pair of legs is received in the first receiving section. The second receiving section may then be empty or may host a third pair of legs.

Alternatively the second pair has already been welded in a preceding step. In this case the device may in a further step be positioned such that the first and the second pair of legs are received in the second receiving section and a new pair of legs is received in the first receiving section.

Hence, a row of radially aligned pairs of legs may be pressed together one after the other without affecting other pairs of legs.

The procedure can be carried out expeditiously.

In a preferred embodiment at least a part of the second clamping element is arranged below the first clamping element, with respect to an axis corresponding to the axis of the stator core.

In particular the first clamping element provides a storing space having a radial width for housing at least a pair of legs of hairpin conductors. The second clamping element provides a receiving space having a radial width which is larger than the sum of the radial extension of a pair of legs of hairpin conductors and the radial width of the storing space provided by the first clamping element.

Thus the upper first clamping element encompasses the second receiving section, whereas the lower second clamping element encompasses the first and the second receiving sections.

Only the first clamping element provides a separation between the first and the second section and no other element has to be introduced between radially adjacent pairs of legs. Hence the risk of damaging conductor legs is reduced.

The second clamping surface may be arranged on the inner side of a head-portion of a U-shape portion of the second clamping element. The first clamping surface may be arranged on the outer side of a head-portion of a U-shape portion of the first clamping element.

The first and the second clamping element may be brought in relative position, such that at least parts of the shanks of the U-shape portions are axially aligned and such that the head portions of the U-shape portions have a radial distance to receive a pair of legs between the clamping surfaces.

The shanks of the U-shaped portions are preferably long enough to host at least a further pair of legs of hairpin conductors adjacent the inside of the head-portion of the first clamping element.

The U-shape portion of the second clamping element may encompass the second receiving section, whereas the U-shape portion of the first clamping element may encompass the first and the second receiving section.

The lower clamping element, in particular a U-shaped portion, may have an extension upwardly projecting, on which the second clamping surface is formed. Hence, the first and the second clamping surfaces are on the same axial position.

The extension may have a U-shaped form. The radial length of shanks of the extension defines a minimal distance between the clamping surfaces. The minimal distance preferably is smaller than the radial width of an unwelded pair of legs. Hence a sufficient compressive force in radial direction may be applied to the legs.

Alternatively the upper clamping element, in particular a U-shaped portion, may have an extension downwardly projecting, on which the first clamping surface is formed.

The distance between shanks of U-shaped portions of the second clamping element and the distance between the shanks of U-shaped portions of the first clamping element correspond to the lateral width of the legs, such that the shanks may encompass and align the legs in a radial direction.

Preferably the distance between shanks of the U-shaped portion of the first clamping element is equal to the distance between the shanks of the U-shaped portion of the second clamping element.

The distances between shanks of U-shaped portions correspond to the circumferential extension of the first and second receiving sections.

Only one pair of legs may be received in the first receiving section and only radially aligned pairs of legs may be received in the second receiving section.

The second clamping surface may be arranged radially further outside than the first clamping surface. Alternatively the second clamping surface may be arranged radially further inside than the first clamping surface.

Preferably the clamping elements comprise U-shaper portions, wherein the head portions point radially inwards. Hence the shanks (and thus the clamping elements) may be moved by an actuating mechanism which is arranged radially outside the stator core. The clamping elements may be moved around the stator from the outside.

The clamping elements may alternatively comprise an F-shape portion, an O-shape portion, an E-shape portion or a comb like portion. All of these forms at least comprise a head section arranged crosswise with respect to a shank section.

In cases where a clamping element comprises an F-shape portion, an E-shape portion or a comb like structure, the single shank may align the legs in a radial direction. The length of the transverse element may correspond to the circumferential extension of the first and/or second receiving sections.

The clamping elements may as well be arranged such that the head portions point radially outwards and an actuating mechanism is arranged radially inwardly of the stator core.

Preferably the clamping elements are arranged, such that only a small relative movement between the clamping elements is allowed to move the clamping surfaces from a first position for inserting the legs and a second position for pressing the legs together.

Preferably the device comprises at least one welding unit.

The welding unit may comprise a tube for blowing Argon and a tube for removing Oxygen.

In a beneficial embodiment the device comprises more than one pair of corresponding first and second clamping elements. Preferentially there is an actuating mechanism and/or a welding unit for each corresponding pair of first and second clamping elements.

The present invention further relates to a system for positioning the ends of at least first pair of legs of hairpin conductors extending from a stator core with respect to a welder tool which comprises at least one device and preferably at least two devices as described above.

The at least two devices may be used simultaneously. This accelerates the welding process.

In a preferred embodiment there is provided a first pair of a first clamping element and a second clamping element. In this first pair the first receiving section is arranged radially further outside than the second receiving section. Hence the device is acting from an area inside the periphery of the stator core. The stator may comprise structures that impede an access with a device from an area outside the periphery. By providing at least one first pair acting from inside access problems caused by such structures may be avoided.

In this case, preferentially, the system additionally comprises at least a second device. The second device has a second pair of a first clamping element and a second clamping element. The first receiving section is arranged radially further inside than the second receiving section. Hence the second device(s) is/are acting from the outside of the stator core.

According to the present invention a method for positioning the ends of at least a first pair of legs of hairpin conductors extending from a stator core with respect to a welder tool is provided, preferably in a device as described above.

The device may comprise a support for turning the stator with respect to the clamping elements.

The device may comprise an actuating unit for moving the clamping elements around the stator.

The method comprises the following steps.

The stator is arranged on a support.

A first clamping surface of a first clamping element and a second clamping surface of a second clamping element are positioned on both sides of a first pair of legs, such that a first, preferably radially inner, section between the first clamping surface and the second clamping surface, having a first radial width, receives said pair of legs, whilst a second, preferably radially outer, section inside the first and second clamping element, having a second radial width, receives at least a further pair of legs.

At least one of the clamping elements is radially moved to press the pair of legs against the clamping surface of the other clamping element.

Thus the legs of said first pair of legs are pressed against each other, while the further pair of legs remains unaffected by the clamping elements.

Preferably in a further step the ends of the said first pair of legs are connected.

In a beneficial embodiment of the method in further steps the clamping surfaces may be moved such that a further pair of legs is received in between the clamping surfaces, pressed together and connected. The step is repeated until all radially aligned pairs of legs are connected.

In a next step the clamping surfaces may me positioned at a next radial row of radially aligned pairs of legs. The clamping surfaces may be moved around the stator or the stator is turned with respect to the clamping surfaces.

The radially aligned pairs of legs may each be pressed together and connected one after another.

Preferably two or more pairs of connecting faces are used at the same time for different radially aligned rows of pairs of legs.

Preferably the devices belongs to a system comprising a device for widening ends of legs to radially group pairs of legs for inserting the pairs of legs into pockets of a device for twisting and a device for twisting to circumferentially align legs of conductors which are to be connected.

Figure 2:
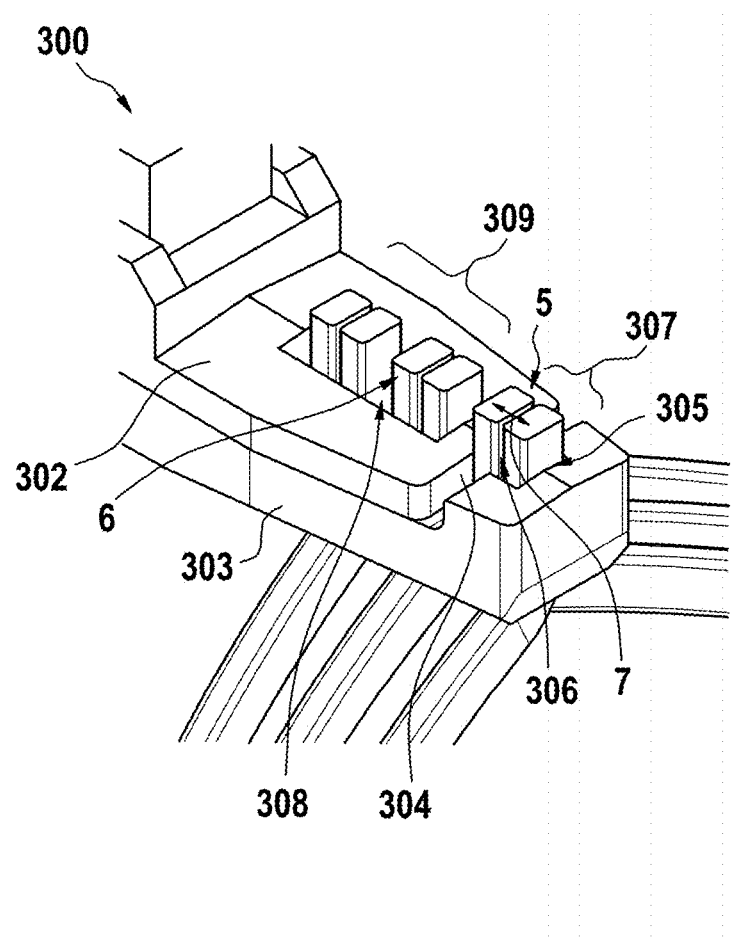
Figure 3:
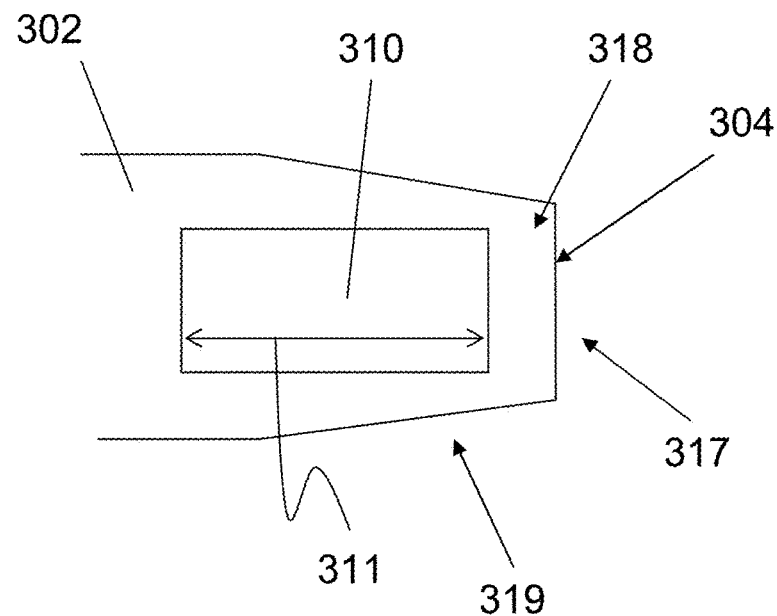
Figure 4:
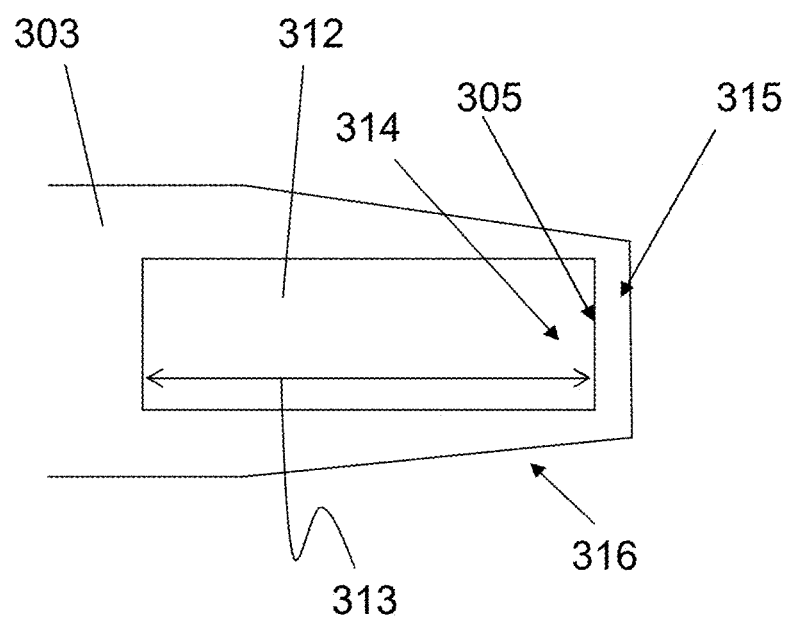
Figure 5:
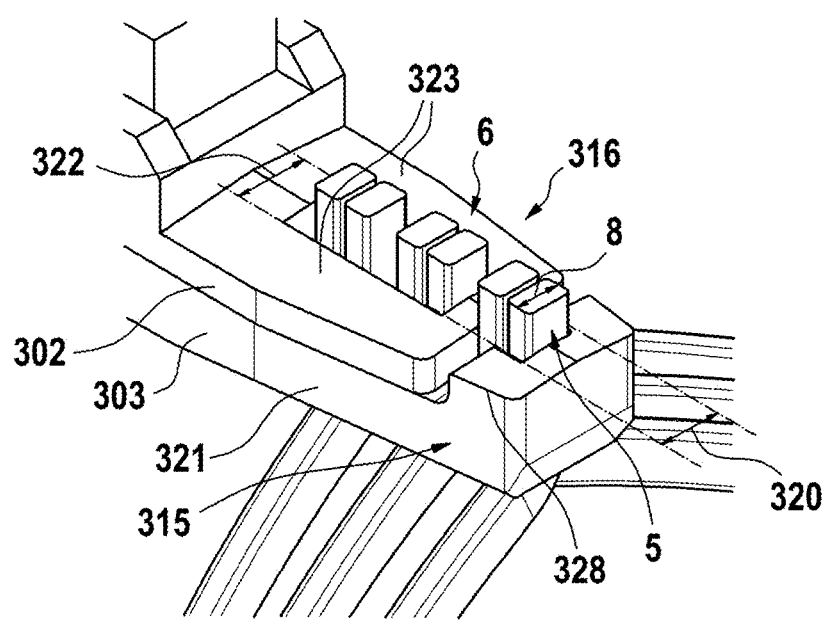
Figure 6:
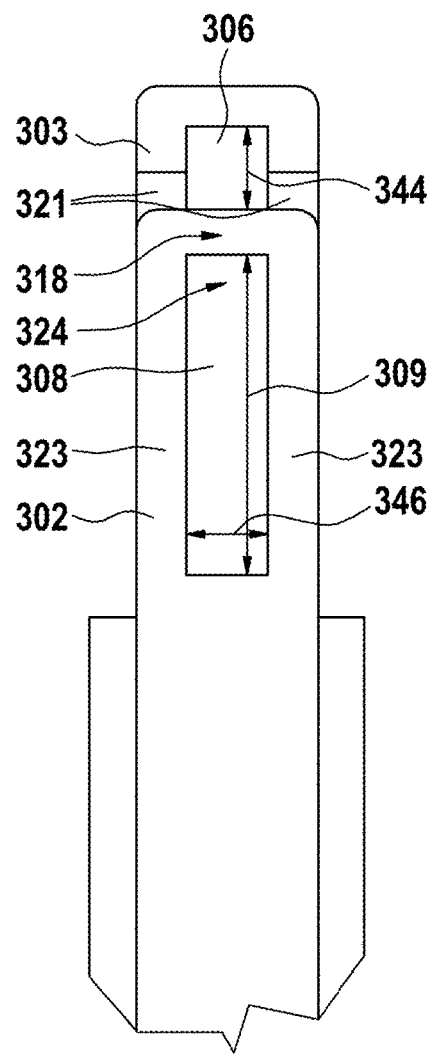
Figure 7:
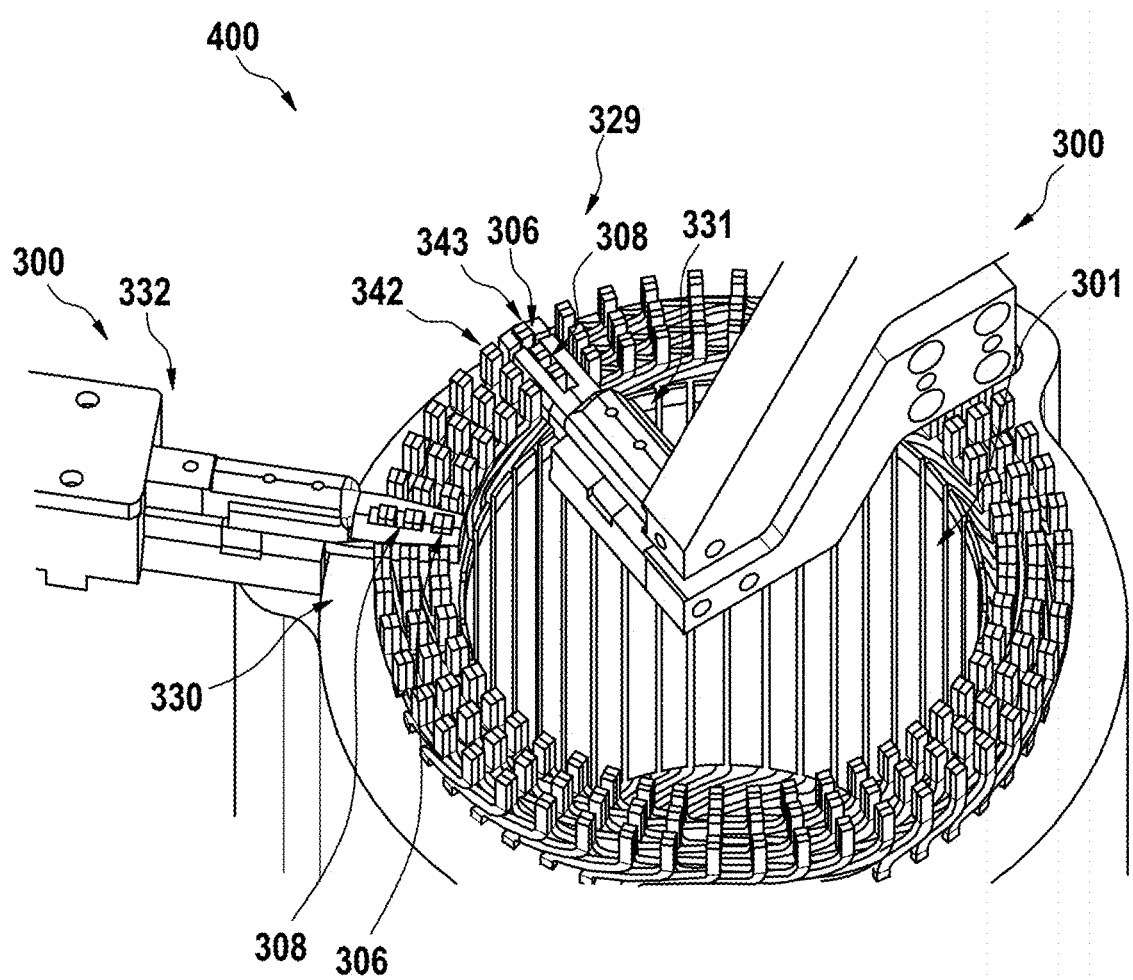
Figure 8:
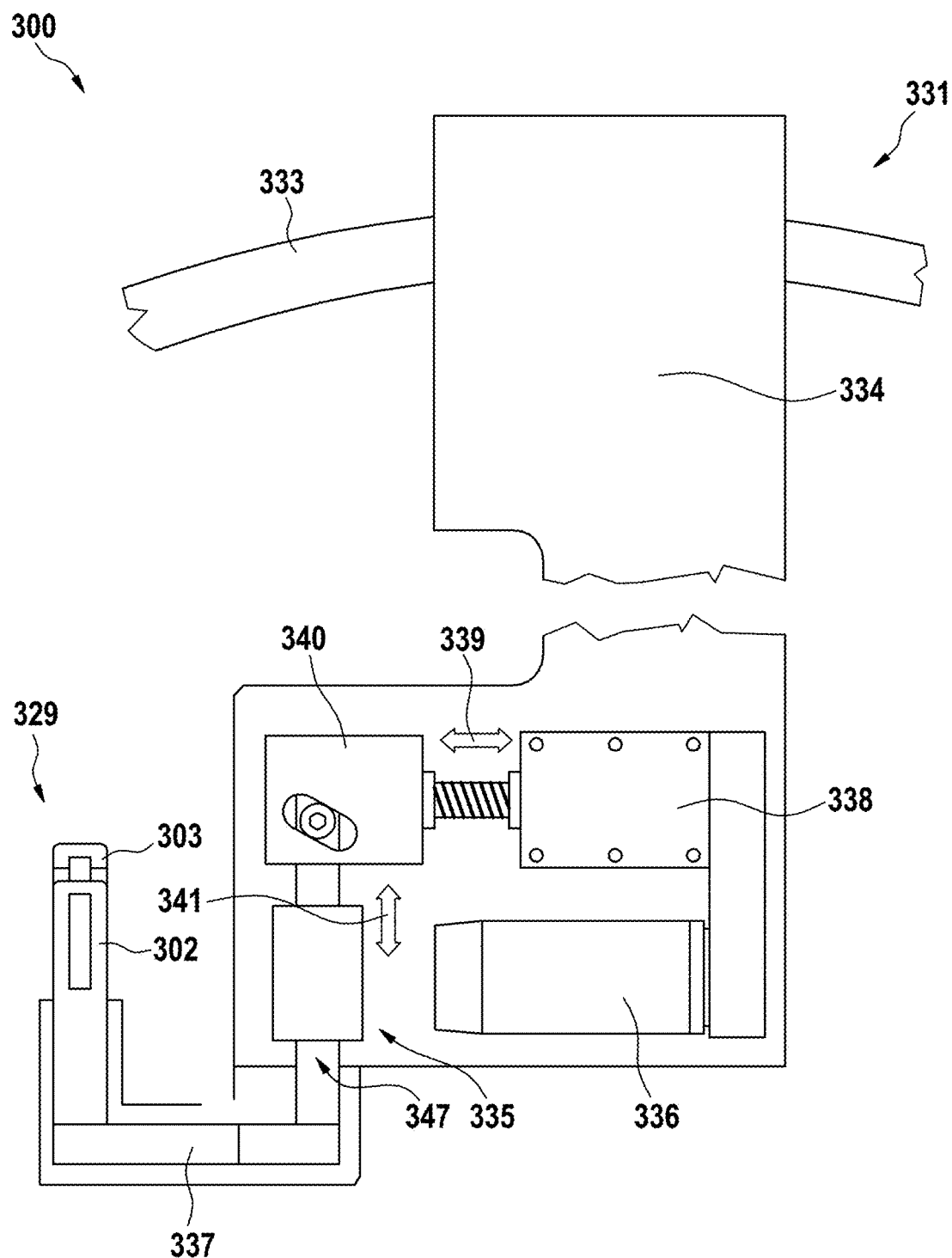
Figure 9:
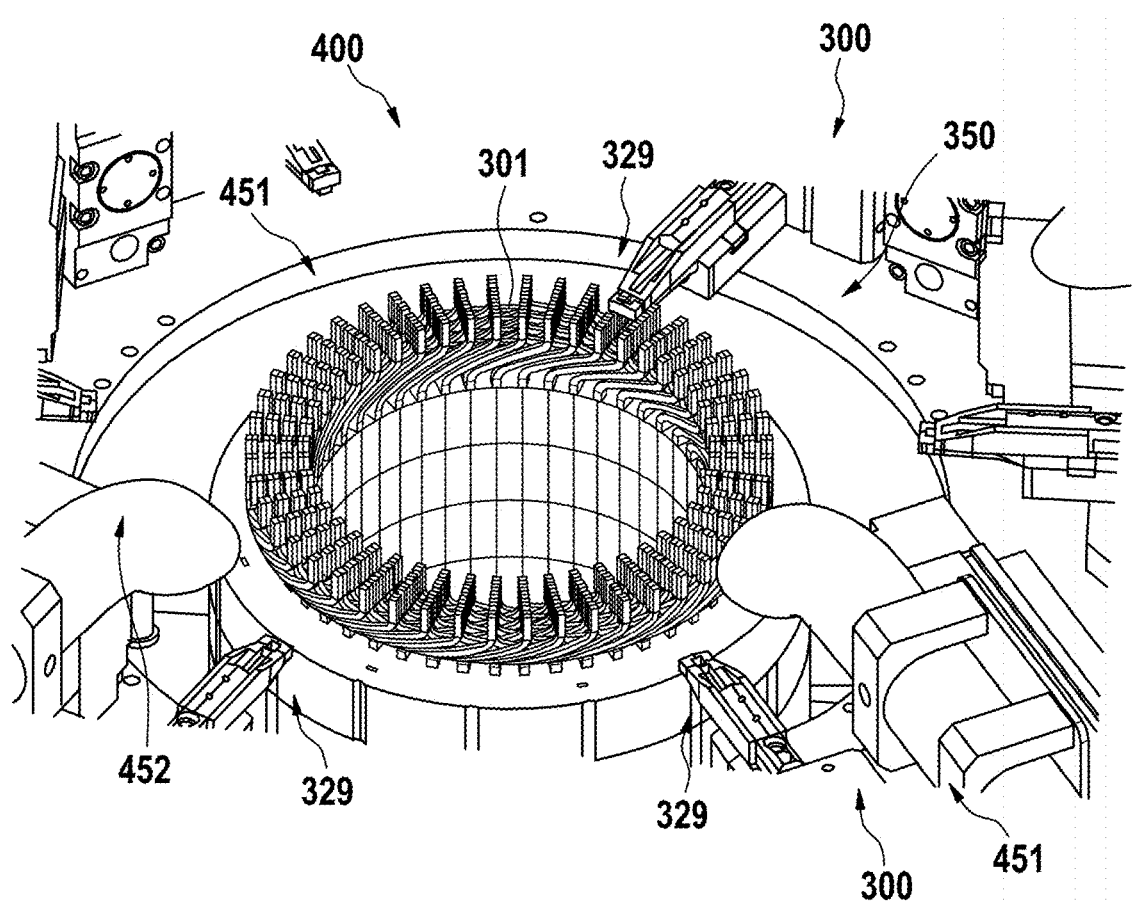

The invention will be explained hereinafter with reference to the description of specific embodiments and the respective drawings, which show:

FIG. 1 a perspective view of a device for positioning the ends of at least first pair of legs of hairpin conductors extending from a stator core with respect to a welder tool;

FIG. 2 a perspective view of a detail of a device according to FIG. 1;

FIG. 3 a schematic presentation of first clamping element in plan view;

FIG. 4 a schematic presentation of second clamping element in plan view;

FIG. 5 a perspective view of a detail of a device according to FIG. 1;

FIG. 6 a schematic presentation of the clamping elements in plan view;

FIG. 7 a perspective view of a first example of a system;

FIG. 8 a schematic presentation of the device in plan view;

FIG. 9 a further perspective view of a second example of a system.

FIG. 1 shows a perspective view of a device 300 for positioning the ends of at least first pair 5 of legs of hairpin conductors extending from a stator core 301 with respect to a welder unit (not explicitly shown in the figures).

Pairs 5, 6 of legs of hairpin conductors are radially aligned in rows. Respective two legs of a pair 5 of hairpin conductors have to be connected, such that the hairpin conductors form a winding of a stator.

To guarantee a precise connection process, the pair 5 of legs of hairpin conductors have to be precisely aligned in the radial and circumferential direction. If the legs are circumferentially aligned they have only to be pressed together in the radial direction.

FIG. 2 shows a perspective view of a detail of a device 300 according to FIG. 1.

The device 300 comprises a first clamping element 302 and a second clamping element 303. The first clamping element 302 is radially moveable independently from the second clamping element 303 (see FIG. 8).

The first clamping element 302 has a first clamping surface 304 and said second clamping element 303 has a second clamping surface 305. The first and second clamping surfaces 304, 305 are radially facing each other.

The clamping elements 302, 303 form a first, radially inner, receiving section 306 between the first clamping surface 304 and the second clamping surface 305, having a first radial width 307 dimensioned to axially receive and clamp a first pair 5 of legs during welding, thus being at least as large as the radial extension 7 of a pair 5 of legs of hairpin conductors.

The clamping elements 302, 303 form a second, radially outer, receiving section 308 inside the first clamping element 302 and the second clamping element 303, having a second radial width 309, dimensioned to receive at least a further pair 6 of legs during welding of the first pair 5 of legs.

The second clamping 303 element is arranged below the first clamping element 302.

FIG. 3 shows a schematic presentation of first clamping element 302 in plan view.

The first clamping element 302 provides a storing space 310 having a radial width 311 for housing at least a pair 6 of legs of hairpin conductors (see FIG. 2).

The first clamping surface 304 is arranged on the outer side 317 of a head-portion 318 of a U-shape portion 319 of the first clamping element 302.

FIG. 4 shows a schematic presentation of second clamping element 303 in plan view.

The second clamping element 303 provides a receiving space 312 having a radial width 313 which is larger than the sum of the radial extension 7 of a pair 5 of legs of hairpin conductors (see FIG. 2) and the radial width 311 of the storing space 310 provided by the first clamping element 302 (see FIG. 3).

The second clamping surface 305 is arranged on the inner side 314 of a head-portion 315 of a U-shape portion 316 of the second clamping element 303.

FIG. 5 shows a perspective view of a detail of a device according to FIG. 1.

The distance 320 between shanks 321 of U-shaped portions 316 of the second clamping element 303 as well as the distance 322 between the shanks 323 of the first clamping element 302 corresponds to the lateral width 8 of the legs, such that the shanks 321, 323 laterally encompass and align the pairs 5, 6 of legs.

The head portion 315 of the second clamping element 303 comprises an extension 328 which protrudes axially, such that the clamping surfaces face each other.

FIG. 6 shows a schematic presentation of the clamping elements 302, 304 in plan view.

The shanks 321, 323 of the clamping elements 302, 304 are long enough to host at least a further pair 6 of legs of hairpin conductors (see FIG. 5) adjacent the inside 324 of the head-portion 318 of the first clamping element 302.

The first receiving section 306 has maximal radial width 344 in a range of 4.5 mm to 10.5 mm.

The second receiving section 308 has minimal radial width 309 in a range of 11 mm to 23 mm.

The first receiving section 306 and the second receiving section 308 have a circumferential width in a range of 2.5 mm to 5.5 mm.

FIG. 7 shows a system 400 comprising two devices 300.

The system 400 hence comprises more than one pair 329, 330 of corresponding first and second clamping elements.

In a first pair 329 of clamping elements the second clamping surface 305 is arranged radially further outside than the first clamping surface 304 (see FIG. 2). The actuating mechanism 331 is arranged above the stator core 301 and acting from an area within a periphery of the stator core 301, hence the first pair 329 belongs to an internal clamping mechanism.

For the internal clamping mechanism the first receiving section 306 is arranged radially further outside than the second receiving section 308.

In a second pair 330 of clamping elements the second clamping surface 305 is arranged radially further inside than the first clamping surface 304 (see FIG. 2). The actuating mechanism 332 is arranged above the stator core 301 and acting from an area outside the stator core 301, hence the second pair 330 belongs to an external clamping mechanism.

For the external clamping mechanism the first receiving section 306 is arranged radially further inside than the second receiving section 308.

The shanks 321, 323 (see FIG. 6) are dimensioned to be inserted between two adjacent rows 342, 343 of radially aligned pairs of legs.

FIG. 8 shows a schematic presentation of the device 300 in plan view.

The device 300 comprises an actuating mechanism 331 for moving the clamping elements 302, 302. The actuating mechanism 331 is rotated around the stator core 301 (see FIG. 7) on a circular guide 333. A controlled movement mechanism 334 provides a radial in/out and a vertical up/down movement for jointly positioning the pair 329 of clamping elements.

For the relative movement of the clamping elements 302, 303, the first clamping element 302 is radially moved with respect to the second clamping element 303.

A radial guide 335 comprises a rod 347 driven by a motor 336, which is connected to the first clamping element 302 by a support 337.

A converter 338 converts the rotational movement provided by the motor 336 into a lateral translation 339.

A carriage 340 converts the lateral translation 339 into a radial translation 341.

FIG. 9 shows a second embodiment of a system 400 comprising a plurality of devices 300, e.g. six devices.

The actuating mechanisms 331 for each pair 329 of clamping elements are mounted to a machine frame 350 and are arranged around the stator core 301.

The actuating mechanisms 331 are acting from an area outside the stator core 301.

The machine frame 350 and the stator core 301 are rotatable with respect to each other. Preferably, the machine frame 350 is fixedly arranged while the stator core 301 is arranged rotatably and is connected to a motor (not shown) for rotating the stator core 301.

Each device 300 is assigned to a welding unit 451 and to a tube 452 for suction of welding fumes. It is also possible to have tubes (not shown) for blowing an inert gas such as Argon and/or for removing Oxygen.

The invention claimed is:

1. A device for positioning ends of at least a first pair of legs of hairpin conductors extending from a stator core with respect to a welder tool, the device comprising:
   a first clamping element having a first clamping surface; and
   a second clamping element having a second clamping surface,
   wherein:
   said first clamping element and said second clamping element are independently moveable radially relative to each other along a radial direction, said first clamping surface and said second clamping surface are radially facing each other and generate a radial clamping force on the ends of the first pair of legs of hairpin conductors when moved radially relative to each other along the radial direction, and
   the first clamping element and the second clamping element form a first receiving section between said first clamping surface and said second clamping surface, having a first radial width dimensioned to axially receive and clamp the first pair of legs of hairpin conductors during welding, and a second receiving section inside said first clamping element and said second clamping element, having a second radial width, dimensioned to receive at least a further pair of legs during welding of said first pair of legs, wherein at least a part of the second clamping element is arranged below the first clamping element with respect to an axis corresponding to an axis of the stator core.

2. The device of claim 1, wherein said second clamping surface is arranged radially further outside than said first clamping surface.

3. The device of claim 1, wherein the first clamping element and the second clamping element are moveable together upwards and downwards in an axial direction.

4. The device of claim 3, wherein the first clamping element and the second clamping element are moveable together in the vertical direction.

5. The device of claim 1, further comprising a welding unit.

6. The device of claim 1, further comprising a support for holding said stator core.

7. The device of claim 1, wherein the first receiving section comprises a radially inner receiving section.

8. The device of claim 1, wherein the second receiving section comprises a radially outer receiving section.

9. A device for positioning ends of at least a first pair of legs of hairpin conductors extending from a stator core with respect to a welder tool, the device comprising:
   a first clamping element having a first clamping surface; and
   a second clamping element having a second clamping surface,
   wherein:
   said first clamping element and said second clamping element are independently moveable radially relative to each other along a radial direction, said first clamping surface and said second clamping surface are radially facing each other;
   the first clamping element and the second clamping element form a first receiving section between said first clamping surface and said second clamping surface, having a first radial width dimensioned to axially receive and clamp the first pair of legs of hairpin conductors during welding, and a second receiving section inside said first clamping element and said second clamping element, having a second radial width, dimensioned to receive at least a further pair of legs during welding of said first pair of legs, wherein at least a part of the second clamping element is arranged below the first clamping element with respect to an axis corresponding to an axis of the stator;
   the first clamping element provides a storing space having a first radial width dimensioned for housing at least the further pair of legs of hairpin conductors; and
   the second clamping element provides a receiving space having a second radial width which is larger than a sum of a radial extension of the first pair of legs of hairpin conductors and said first radial width of the storing space provided by said first clamping element.

10. The device of claim 9, wherein:
    said second clamping surface is arranged on an inner side of a head-portion of a U-shaped portion of said second clamping element, and
    said first clamping surface is arranged on an outer side of a head-portion of a U-shaped portion of said first clamping element.

11. The device of claim 10, wherein a distance between first radially extending shanks of U-shaped portions of said second clamping element and a distance between second radially extending shanks of U-shaped portions of said first clamping element correspond to a lateral width of the first pair of legs of hairpin conductors, such that said first shanks and said second shanks encompass and align said first pair of legs in a radial direction.

12. The device of claim 11, wherein said first shanks and said second shanks of the U-shaped portions are long enough to host at least the further pair of legs of hairpin conductors adjacent an inside portion of said head-portion of said first clamping element.

13. A system for positioning ends of at least a first pair of legs of hairpin conductors extending from a stator core with respect to a welder tool, said system comprising at least two devices according to claim 1.

14. The system of claim 13, wherein at least a first pair of said first clamping element and said second clamping element has said first receiving section arranged radially further outside than said second receiving section.

15. The system of claim 14, wherein a second pair of said first clamping element and said second clamping element has said first receiving section arranged radially further inside than said second receiving section.

16. A method for positioning ends of at least a first pair of legs of hairpin conductors extending from a stator core with respect to a welder tool, the method comprising:
    arranging the stator on a support;
    positioning a first clamping surface of a first clamping element and a second clamping surface of a second clamping element on both sides of the first pair of legs, wherein a first section between said first clamping surface and said second clamping surface, having a first radial width, receives said first pair of legs, while a second section inside said first clamping element and said second clamping element, having a second radial width, receives at least a further pair of legs of hairpin conductors, wherein at least a part of the second clamping element is arranged below the first clamping element with respect to an axis corresponding to an axis of the stator core; and
    radially moving at least one of said first clamping element and said second clamping element to press said first pair of legs against a respective clamping surface of another clamping element to generate a radial clamping force on the ends of the first pair of legs of hairpin conductors when moved radially relative to each other along a radial direction.

17. The method of claim 16, further comprising connecting said ends of said first pair of legs.

18. The method of claim 16, wherein said first section comprises a radially inner section.

19. The method of claim 16, wherein said second section comprises a radially outer section.

* * * * *